(12) United States Patent
Chamami

(10) Patent No.: US 11,882,803 B2
(45) Date of Patent: Jan. 30, 2024

(54) COMPACT CLOSED-SPACE SYSTEM FOR ILLUMINATION, CLIMATE CONTROL AND AIR PURIFICATION

(71) Applicant: GROWOP WORLD LTD., Tel Aviv (IL)

(72) Inventor: Ziv Chamami, Tel Aviv (IL)

(*) Notice: Subject to any disclaimer, the term of this patent is extended or adjusted under 35 U.S.C. 154(b) by 115 days.

(21) Appl. No.: 17/633,243

(22) PCT Filed: Aug. 20, 2019

(86) PCT No.: PCT/IL2019/050930
§ 371 (c)(1),
(2) Date: Feb. 7, 2022

(87) PCT Pub. No.: WO2021/033175
PCT Pub. Date: Feb. 25, 2021

(65) Prior Publication Data
US 2022/0354067 A1   Nov. 10, 2022

(51) Int. Cl.
*A01G 9/24* (2006.01)
*F24F 7/003* (2021.01)
*A01K 1/00* (2006.01)
*B01D 53/04* (2006.01)
*F21V 17/00* (2006.01)
*F21V 33/00* (2006.01)
*F24F 7/007* (2006.01)

(52) U.S. Cl.
CPC .............. *A01G 9/246* (2013.01); *A01G 9/249* (2019.05); *A01K 1/0052* (2013.01); *A01K 1/0076* (2013.01); *B01D 53/0446* (2013.01); *F21V 17/002* (2013.01); *F21V 33/0096* (2013.01); *F24F 7/003* (2021.01); *F24F 7/007* (2013.01); *B01D 2253/102* (2013.01); *B01D 2257/708* (2013.01); *B01D 2257/90* (2013.01)

(58) Field of Classification Search
CPC ......... A01G 9/246; A01G 9/249; F24F 7/003; F24F 7/007; A01K 1/0052; A01K 1/0076; B01D 53/0446; F21V 17/002; F21V 33/0096
See application file for complete search history.

(56) References Cited

U.S. PATENT DOCUMENTS

| 6,352,358 | B1* | 3/2002 | Lieberman et al. | F21V 15/00 362/373 |
| 11,627,707 | B1* | 4/2023 | Leichtle | F21V 29/767 362/547 |
| 2009/0288340 | A1 | 11/2009 | Hess | |
| 2014/0069007 | A1 | 3/2014 | Chen et al. | |
| 2016/0057944 | A1 | 3/2016 | Smits et al. | |
| 2016/0123603 | A1* | 5/2016 | Chen | F24C 15/2064 126/299 D |
| 2016/0178179 | A1 | 6/2016 | Hanson et al. | |

(Continued)

*Primary Examiner* — Christopher E Dunay

(57) ABSTRACT

A compact conditioning system for controlling a volume, comprises: (a) at least one light source, said light source being coupled with a replaceable focusing lens; (b) at least one fan; (c) at least one temperature sensor; (d) control circuitry adapted to receive inputs from said sensor(s) and/or from a user, and to operate said light source(s) and/or said fan(s) as a result thereof; and (e) a housing suitable to house said light source, fan and control circuitry and adapted to be positioned at the top of a structural element defining a closed space.

19 Claims, 8 Drawing Sheets

(56) References Cited

U.S. PATENT DOCUMENTS

| | | | | |
|---|---|---|---|---|
| 2019/0114935 A1* | 4/2019 | Nolan | .................. | F24C 15/2064 |
| 2019/0360686 A1* | 11/2019 | Pendo et al. | ........... | G08B 21/14 |
| 2022/0096702 A1* | 3/2022 | Laseur | ............... | B01D 46/0028 |
| 2022/0249729 A1* | 8/2022 | Hill | ........................... | F21S 8/02 |

* cited by examiner

COMPACT CLOSED-SPACE SYSTEM FOR ILLUMINATION, CLIMATE CONTROL AND AIR PURIFICATION

FIELD OF THE INVENTION

The present invention relates to the field of indoor climate control systems and/or illumination systems. More particularly, the invention relates to a portable system for indoor illumination, particularly for vegetable-growth and incubation purposes, climate control and air purification.

BACKGROUND OF THE INVENTION

In plant cultivation, some of the main parameters that affect growth are temperature, lighting conditions, the presence and concentration of gases that surround the plants (such as carbon dioxide and oxygen), air humidity and moisture levels around the roots. In order to obtain the best outcome, one needs to constantly monitor and adjust the conditions of a growth area, according to many factors, for example, according to the type of plant and also according to each stage of growth. Similarly, environmental conditions are important for a variety of other uses, such as for incubation purposes, e.g., of eggs, etc.

To date, growers have several tools to control the range of factors influencing the climate within a protected growing environment. At the simplest level, some control systems comprise manually operated vents or windows, to give some control over temperature and humidity levels, while using natural light and ambient CO2. At a more advanced level, there are types of enclosed growing facilities, such as growth chambers, which monitor and control the climate within the structure of the chamber. However, these facilities usually are bulky and fixed, or can only be slightly adjusted, but still as integral units. Thus, these facilities often require a large room, and do not provide sufficient flexibility for different conditions and locations.

As said, the need for illumination, climate control and air purification is not limited only to the field of plant growth, but can also be necessary in other types of facilities, for example in hatching facilities, where temperature and air composition influence the hatching process. A variety of other environments can also benefit from controlled conditions.

It is an object of the present invention to provide a system for the illumination, climate control and air purification, which is compact and can be fitted easily in closed spaces, including existing structures, intended, among other things, for plant growth, hatcheries, residential buildings, etc., without the need to provide fixed structures for their installation.

It is another object of the invention to provide such a system which is easily moved from one location to another and can be quickly put in place and in operation.

It is a further object of the invention to provide a method for optimizing the climate control of a chamber provided with a system according to the invention.

In the context of this specification the illumination, climate control and air purification, and any combination of said activities, is termed "conditioning", for the sake of brevity and clarity.

Other objects and advantages of the invention will become apparent as the description proceeds.

SUMMARY OF THE INVENTION

The invention relates to a compact conditioning system for controlling a volume, comprising:
(a) at least one light source, said light source being coupled with a replaceable focusing lens;
(b) at least one fan;
(c) at least one temperature sensor;
(d) control circuitry adapted to receive inputs from said sensor(s) and/or from a user, and to operate said light source(s) and/or said fan(s) as a result thereof; and
(e) a housing suitable to house said light source, fan and control circuitry and adapted to be positioned at the top of a structural element defining a closed space.

The housing is provided with positioning elements adapted to maintain it in positioned relationship with the structural element defining a closed space, which may include a rim extending from the perimeter of the housing, or portions of such a rim. In one embodiment of the invention the system further comprises sealing elements adapted to prevent and/or diminish the flow of air through the opening provided at the top of the closed space.

The system comprises a plurality of fans suitable to promote the circulation of air into and/or from the closed space.

Since light sources typically generate heat, each light source is provided with cooling apparatus, e.g., a fan. Light sources can be "colder" or "hotter", and according to one embodiment of the invention, when greater heat generation is desired, for instance when the closed space is a hatching facility, the light source(s) are adapted to generate heat.

In one embodiment of the invention the one or more light source(s) are located toward the center of the housing element. In another embodiment of the invention the plurality of fans are located on both sides of the light source(s).

For many applications the system of the invention will comprise a filtering cassette adapted to remove odors and/or vapors from within the closed space. In one embodiment the filtering cassette comprises a frame, a top net as the top surface of the cassette, a bottom net as the bottom surface of the cassette, and an absorbent material, e.g., active carbon, located between said nets. In one embodiment the cassette is located above at least one fan, which causes air from inside the closed space to flow therethrough.

The closed space to which the system of invention can be applied can be essentially of any type, and for instance it can be a vegetable-growth receptacle, a hutching facility or a living structure. The skilled person will be able to appreciate the many uses to which the invention can be put, as well as the many types of environments and closed spaces from which invention can benefit.

As said, the light sources employed in the system of invention will generate heat, whether moderate or substantial depending on the type of lighting equipment employed, but it will typically require a cooling arrangement. According to one embodiment, excess heat generated by the light source(s) is removed using one or more fans adapted to circulate air within the controlled volume. The term "controlled volume", as used herein, is meant to indicate a volume that has defined boundaries to which controlled conditions can be applied.

All the above and other characteristics and advantages of the invention will be better understood from the following illustrative and non-limitative description of specific embodiments of the invention.

DETAILED DESCRIPTION OF THE INVENTION

The system of the invention addresses the need for a compact, portable system, which can be fitted to various spaces, e.g. from small cabinets to large rooms, and can be easily and quickly moved from one space to the other. The system of the invention can also be installed in structures (for example cabinets), which are already in a user's possession, thereby preventing the necessity of acquiring additional and redundant space-occupying facilities. Therefore, the system of the invention converts a closed and defined space into a controlled space in terms of illumination intensity, temperature, air composition, humidity, and odor removal.

In one embodiment, the system of the invention permits the identification and control of the temperature and humidity of a desired space, as well as the temperature inside the system itself, by combining various functional units into one structure. Smart algorithms can also be applied for the optimization of the illumination intensity and distribution, the temperature and the humidity in a given space, although the system of the invention can be used per se to accomplish many important advantages, even using manual set-ups and without the need for specialized algorithms. Although the description refers mainly to the use of the system of the invention in closed spaces, for the sake of clarification, it should be noted that it is not limited to a use only in closed spaces, and can be located and operated in any space that one wishes to control. In addition, the system of the invention is often referred to as a "portable system", but it can obviously be provided with a structure, suitable to comprise the system and other objects, on which that the system is applied, which once installed would not necessarily be, properly speaking, "portable" any more.

Reference will now be made to several detailed embodiments of the present invention, examples of which are illustrated in the accompanying figures. Wherever practicable, similar or like reference numbers may be used in the figures and may indicate similar or like functionality. The figures depict embodiments of the present invention for purposes of illustration only. One skilled in the art will readily recognize from the following description that alternative embodiments of the structures illustrated herein may be employed without departing from the principles of the invention described herein.

Figure 1B:
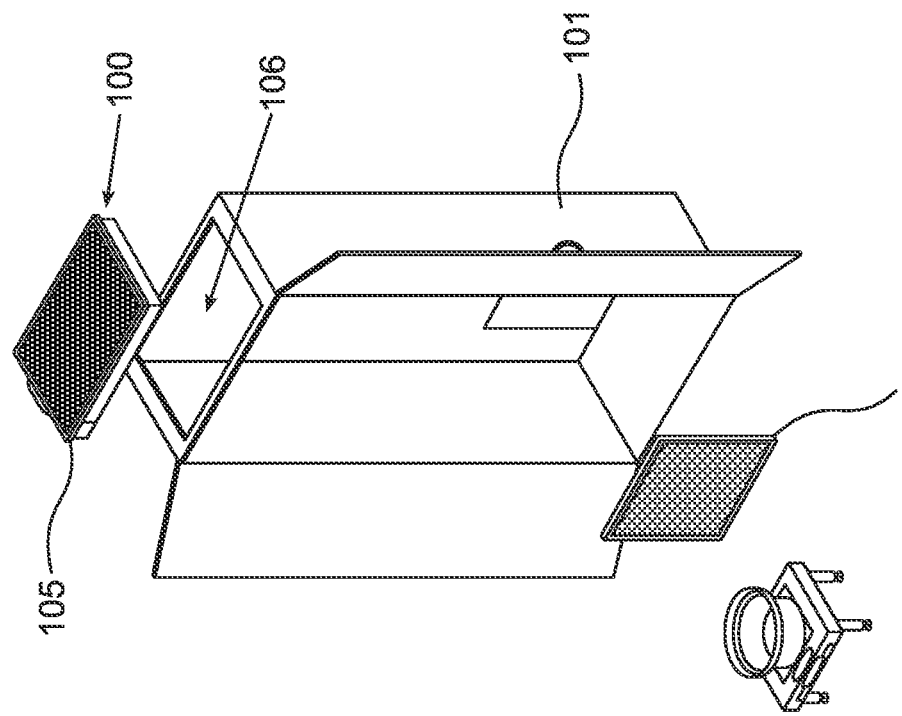
FIG. 1 (a and b) schematically illustrates an embodiment of the invention as applied to a closed space within a closet.
Figure 1A:
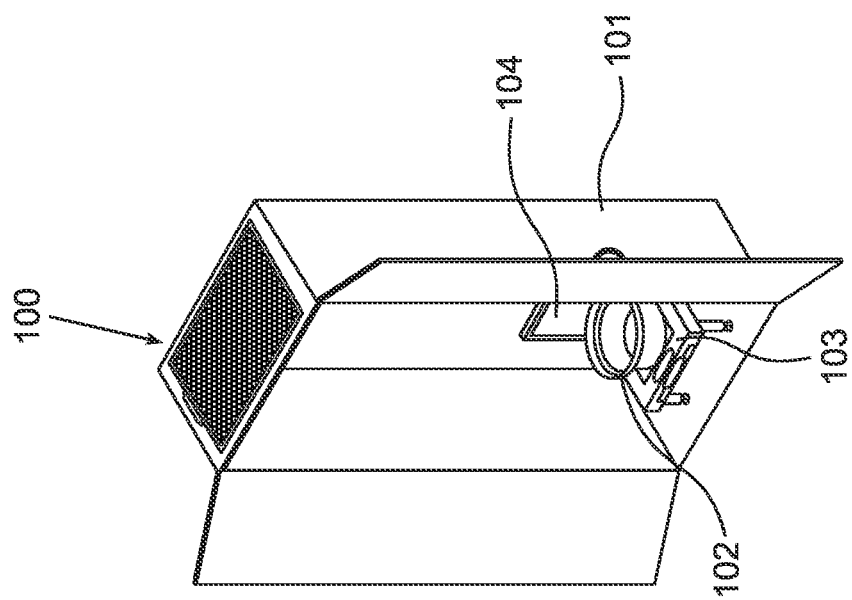

FIG. 1 schematically illustrates the invention as applied to a closet. In FIG. 1(a) a closet 101 is fitted with a system 100 according to the invention. In this particular example a plant pot 102 is provided, which is ready to house a plant to be grown in the closed space. Supporting element 103 can be simply stand or it may comprise irrigation and/or humidification and/or any other subsystem adapted for the specific purpose. In this particular example an air filter 104 is also included, which may be advantageously used in conjunction with the invention.

FIG. 1(b) is an exploded view of FIG. 1(a), from which it is easy to see how system 100 is easily positioned on top of closet 101, simply by providing for the perimeter of rectangular rim 105 to extend beyond the edge of opening 106.

Figure 2:
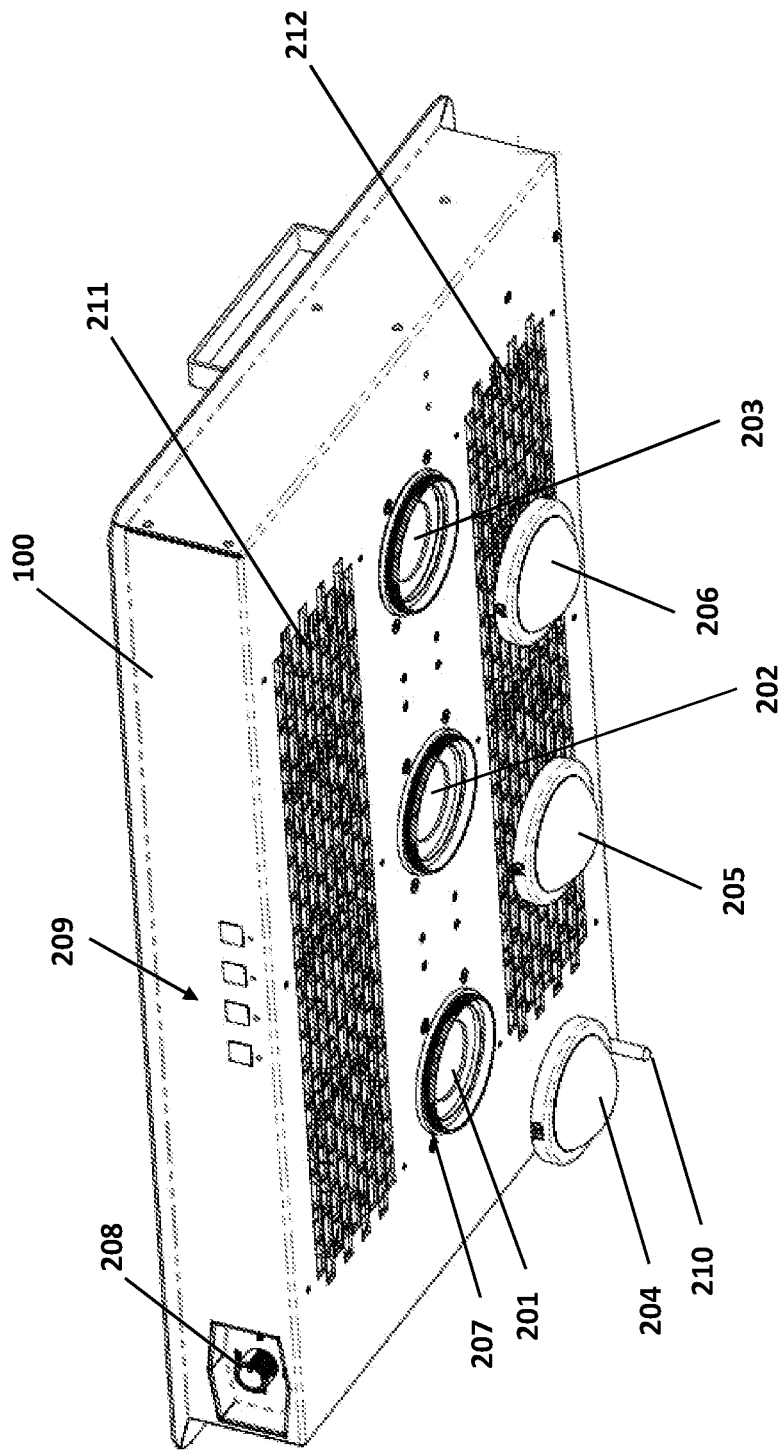
FIG. 2 is a perspective view of the bottom part of the system according to one embodiment of the invention.

FIG. 2 illustrates an important feature of the invention. In this particular embodiment three lighting elements 201, 202 and 203 are employed. Each lighting element is coupled with a lens, indicated in the figure by numerals 204, 205 and 206, respectively. In this particular embodiment the lenses are coupled to the lighting element using a screwing such as 207, used to couple lines 204 to lighting element 201. However, any other coupling method can be employed, such as a snap on arrangement, as long as changing the lenses is made possible.

The ability to change the lenses is of critical importance to the invention, inasmuch as it obviates the need to move the system during use. For instance, when using the invention for plant growth different stages of growth will require different illumination regimes, since a young, low plant will have different needs than a high and highly foliated one. Accordingly, for instance, the field of illumination can be changed, e.g. from 120°, to 90°, 60°, during the lifecycle of the plant, thus providing optimal illumination for different stages of growth. Of course, lenses providing other fields of illumination than those mentioned above can be provided for different uses. As will be apparent to the skilled person, the narrower the field of illumination the farther radiation will reach and, given the same source, a higher localized concentration of lighting is achieved than with a broad field of illumination. An exemplary suitable light source is "Vero 29", manufactured by "bridgelux" (https://www.bridgelux.com/).

Figure 3:
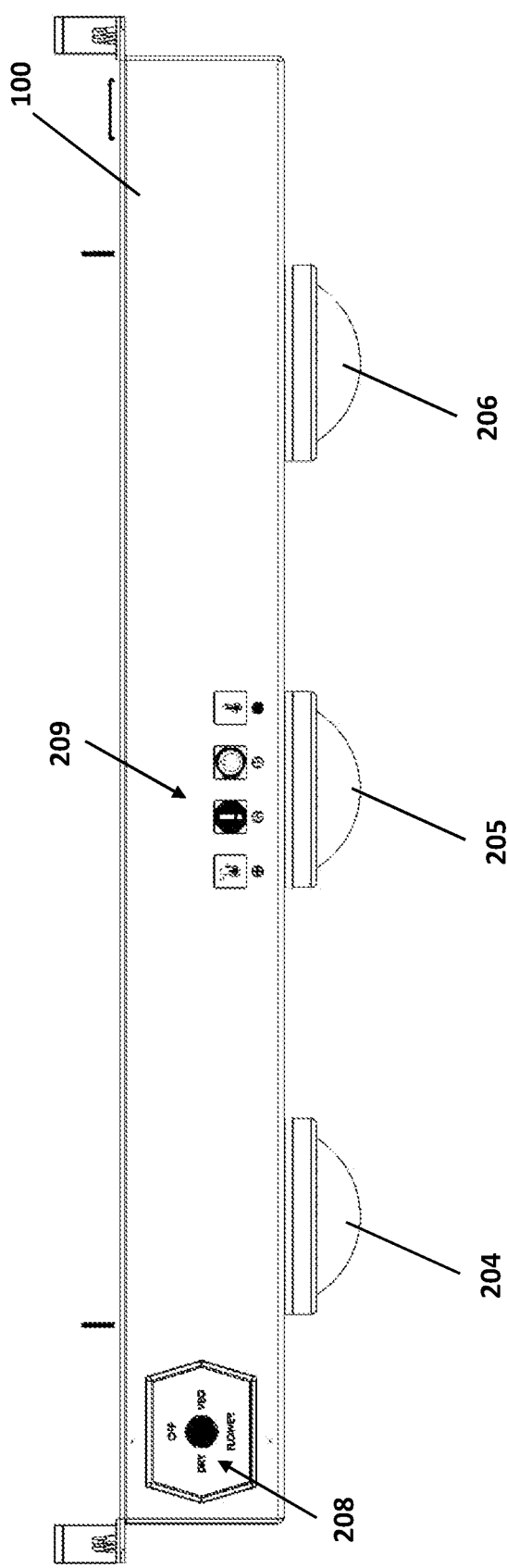
FIG. 3 is a front view of the system of FIG. 2.

Also shown in the figure is power switch 208, which may different operating programs of the system, status lights 209, which may be provided to indicate the current activity of the system, and the temperature sensor 210, useful to gauge the temperature inside the closed space. A side view of the system of FIG. 2 is shown in FIG. 3, which also shows as an illustrative example four different operation modes, "OFF", "DRY", which refers to operation without adding humidification, "VEG", indicating a mode suitable for different vegetable growth, and "FLOWER", which is specific for the growth of flowers. Of course, those are just illustrative examples and are in no way meant to limit the invention.

Figure 4:
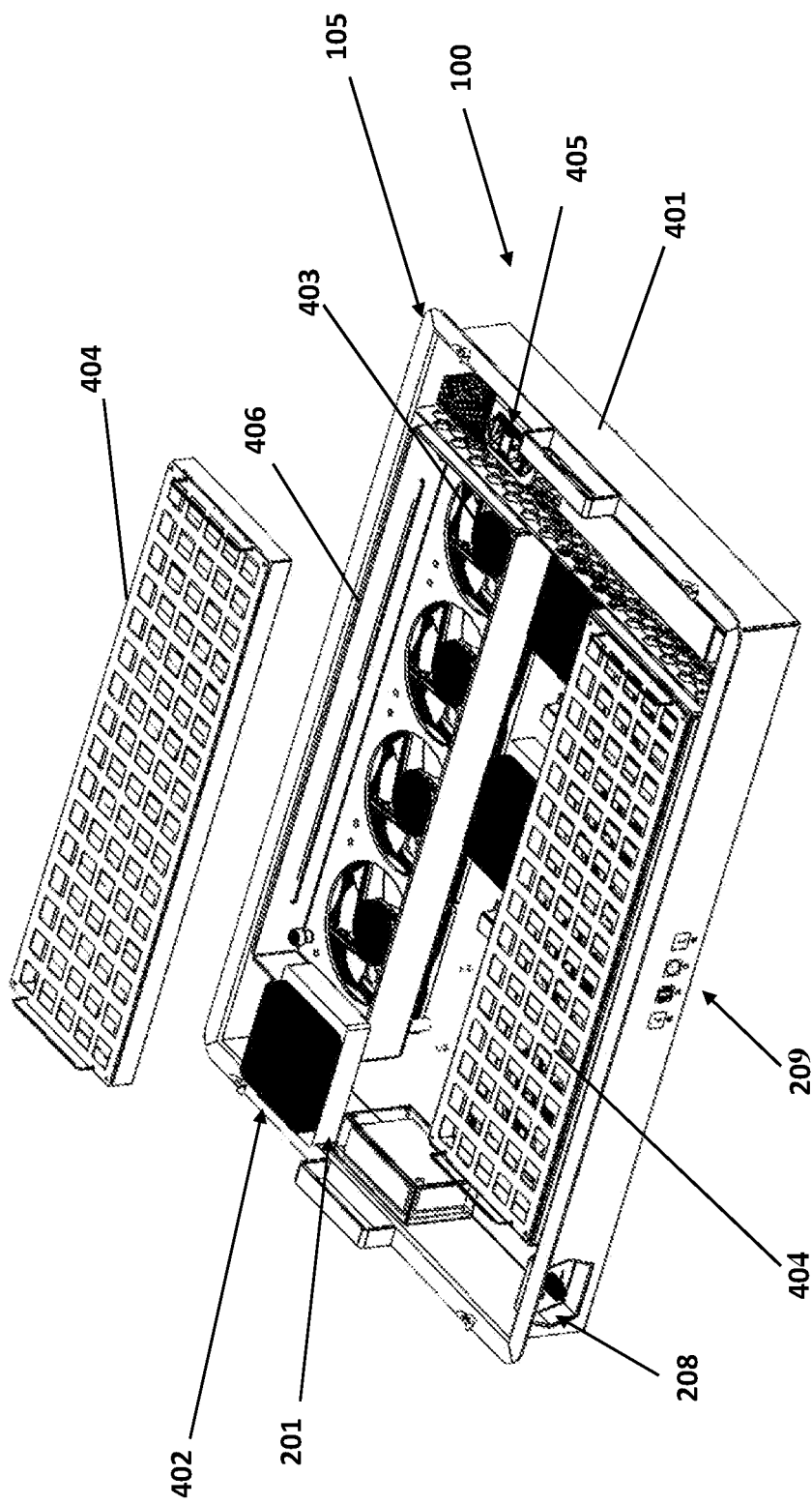
FIG. 4 is a partially exploded view of a system according to one embodiment of the invention.
Figure 5:
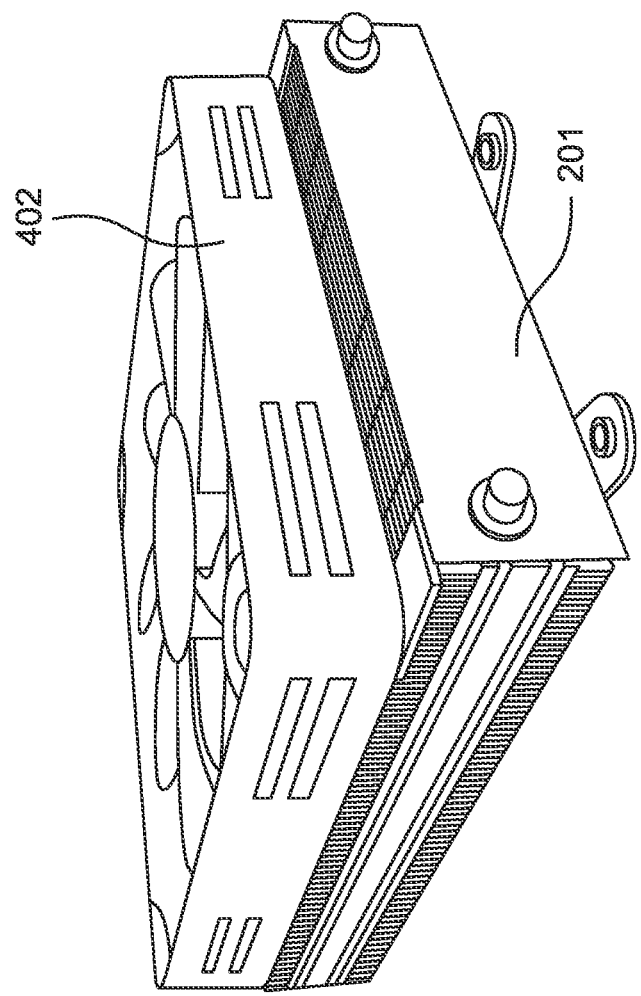
FIG. 5 shows a lighting element with associated cooling device, adapted for use according to the invention.

Looking now at FIG. 4, the system according to this embodiment is contained in a housing 401, provided with a rim 105. Also seen in the figure are switch 208 and control lights 209. A lighting element 201 (as indicated in FIG. 2) is coupled to a cooling member 402, which in this particular embodiment is a fan, as shown in FIG. 5.

A plurality of fans 403 are positioned above grilles 211 and 212 of FIG. 2 (not seen in this figure), which cause the flow of air within the closed space served by the system, e.g., closet 101 of FIG. 1. A cassette 404 is positioned above fans 403 and is filled with absorbent material, for instance activated carbon suitable to absorb bed odors or undesirable contaminants. Two sets of fans 403 and cassette 404 are positioned in this particular embodiment symmetrically on both sides of lighting elements 201. Power delivery elements, including on/off switch, generically indicated by numeral 405, are provided, which are conventional and well understood by the skilled person and, therefore, are not described herein in detail.

Figure 6:
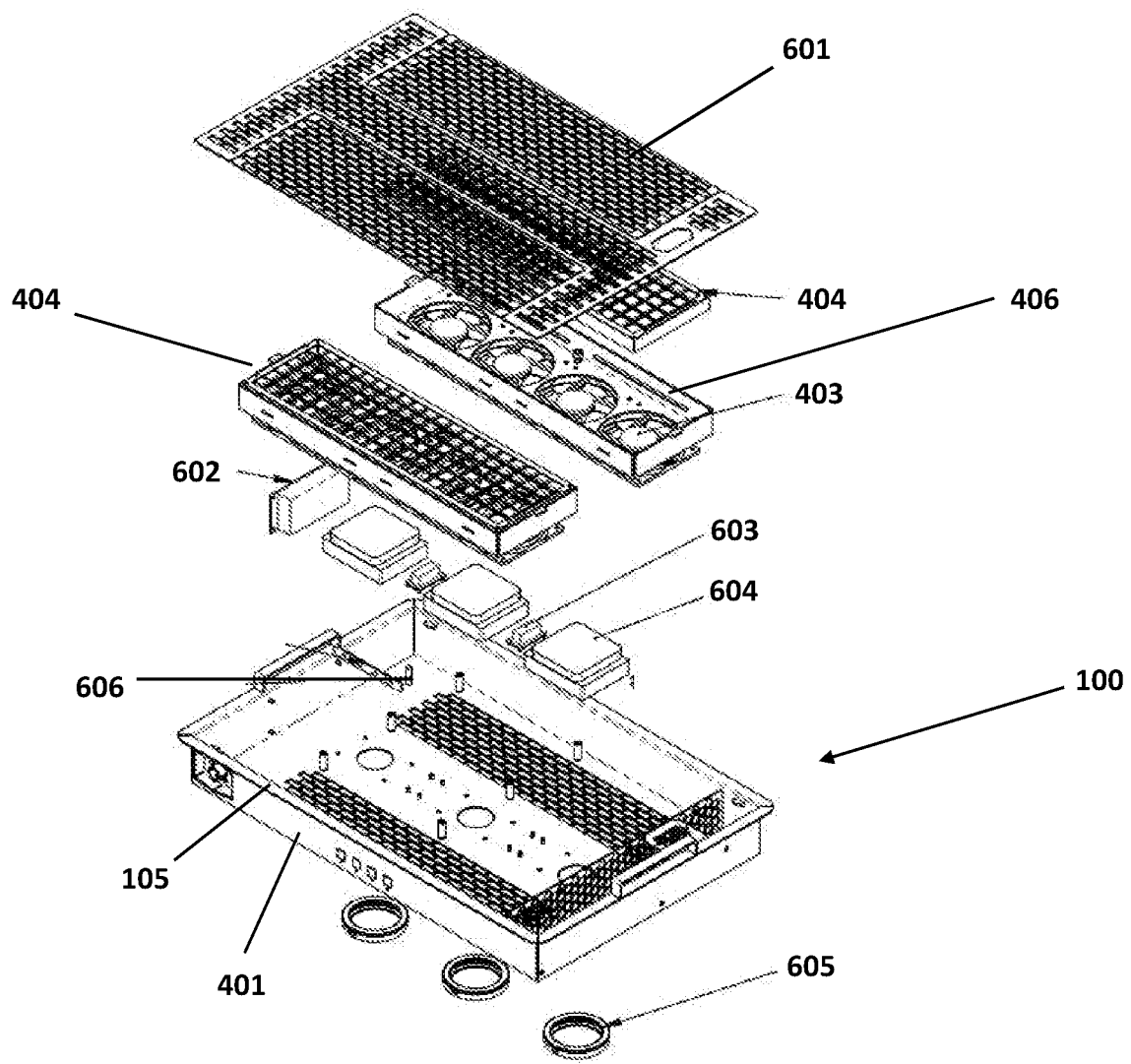
FIG. 6 is a completely exploded view of the device of FIG. 4.

Additional details of this particular embodiment are shown in FIG. 6, in which an upper grille 601 is seen above cassette 404, which in turn is positioned above fan housing 406. Further seen in this figure are the housing of the system controller 602, fan controller 603, lighting and cooling assembly 604, since housing 605 and the temperature and humidity indicators 606. The air filtering cassette 404 is detachable, which enables an easy and comfortable access whenever the filtering material needs to be changed. The air purification unit allows the effective removal of volatile organic compounds, such as odors and different gases that may come from the outside, or evolve from within the controlled unit.

Figure 7:
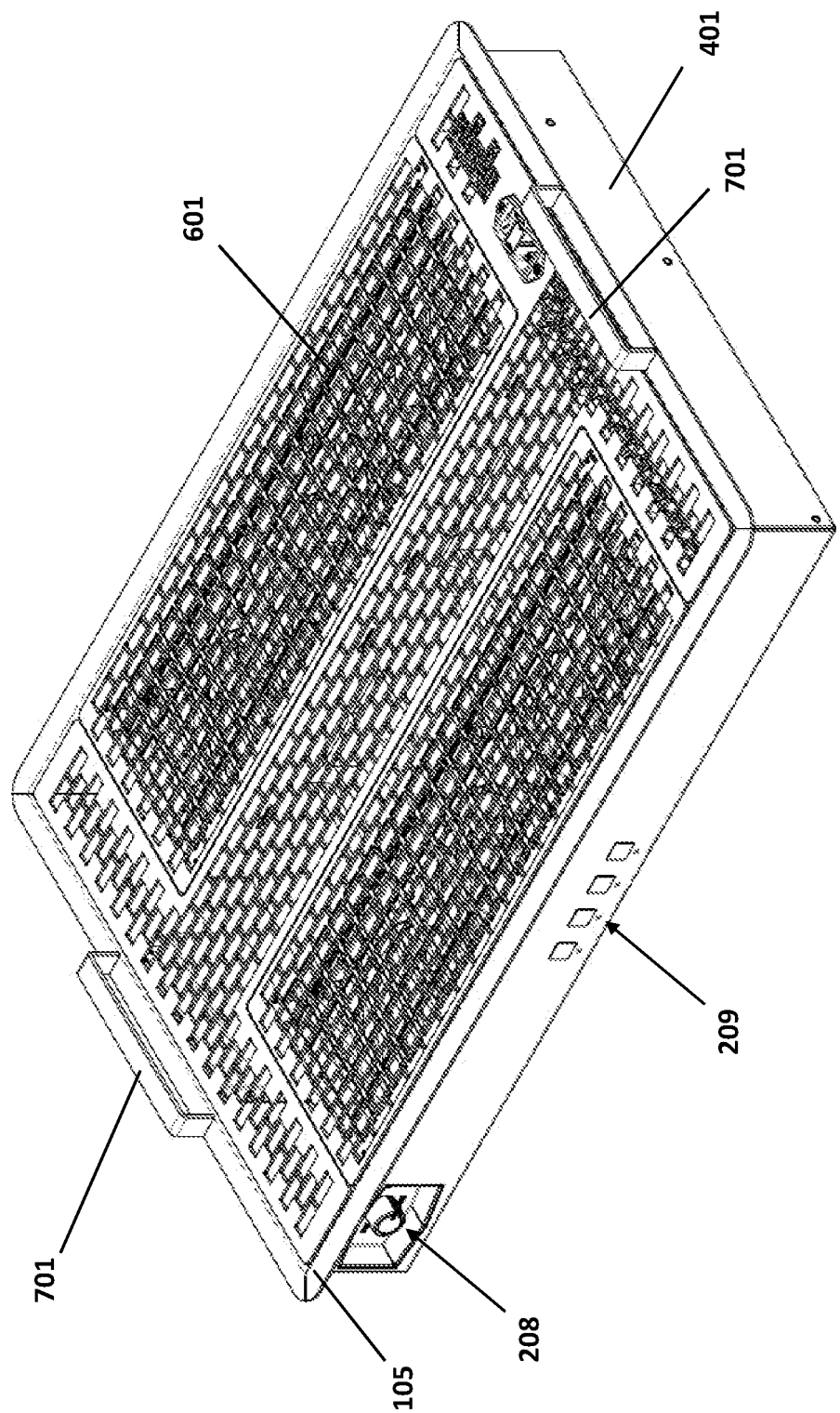
FIG. 7 is a perspective top view of the system of FIG. 6 in assembled position.
Figure 8:
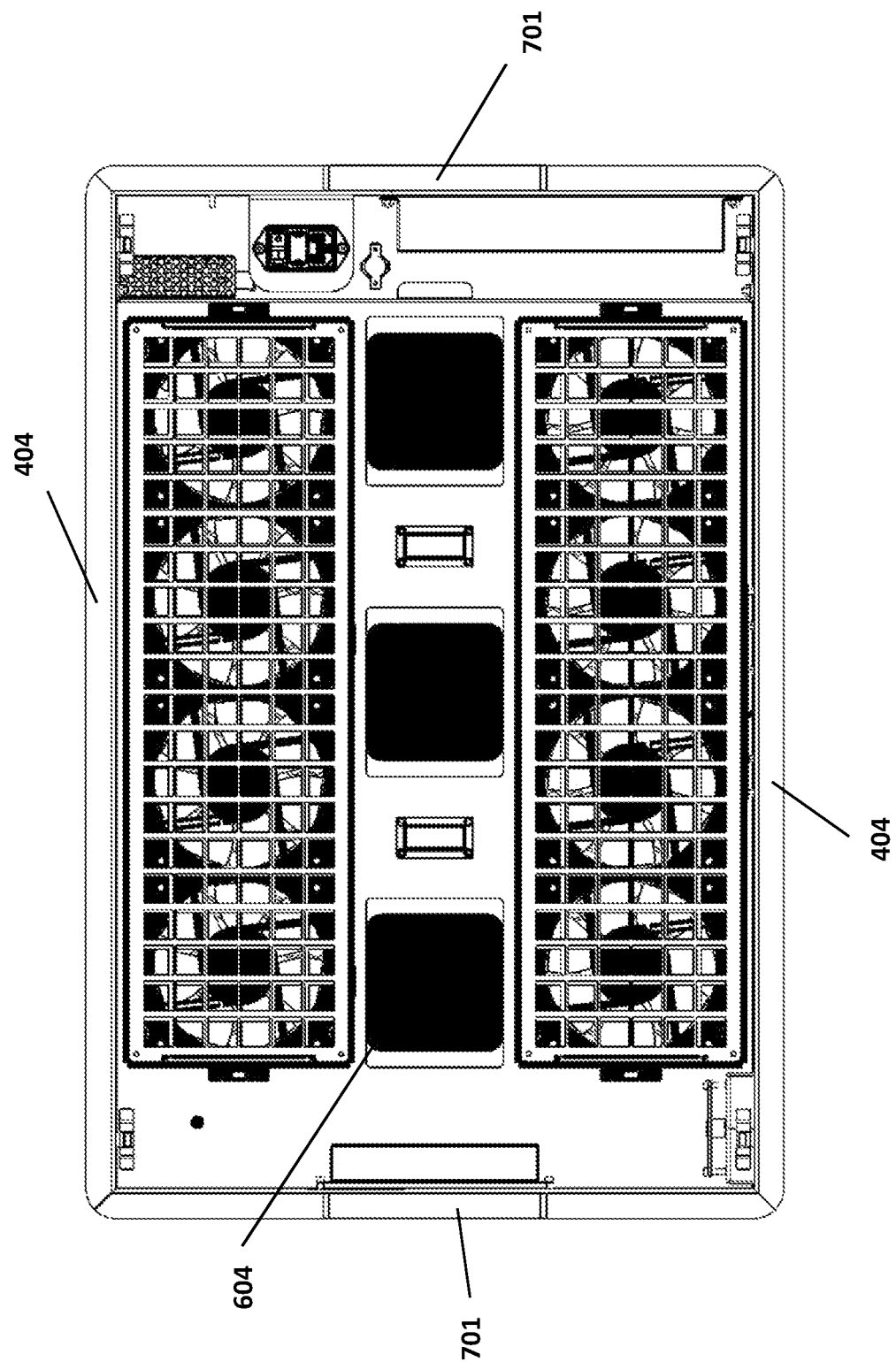
FIG. 8 is a top view of the system of FIG. 7 with the top grille 601 removed.

The system of FIG. 6 is also shown in assembled for in FIG. 7, but also clearly shows handles 701, which can be used to move the system from one location to another. FIG. 8 is a top view of the system of FIG. 7 with the top grille 601 removed.

The light sources 201 may be dimmed, if desired. Dimming of the illumination intensity prevents the system and subsequently the space from overheating. Therefore, the dimming mechanism serves as an internal safety mechanism, and may be usefully operated in connection with a climate-control algorithm. In one specific embodiment of the invention, when the system detects that the temperature in a defined space is about to reach a temperature higher than desired, the light intensity is dimmed or even completely turned off, in order to keep from adding heat to the space by the light source, and thus preventing the space from being overheated and contributing to the cooling of the space.

According to one particular embodiment of the invention, the illumination intensity of light source 201 is controlled by a controlling algorithm. The algorithm takes into account the dimension variables of the closed space volume, namely height, width and depth of the space, as well as the desired light intensity in Lux and/or photosynthetically available radiation (PAR) units [PAR or Lux meter necessary], and determines the optimal maximal required light intensity accordingly. Thus, according to this embodiment of the invention the algorithm allows the adjustment of light intensity in a given space according to the plant's needs. Furthermore, the algorithm allows a single casing of the system of the invention to be portable and adjustable to a variety of desired closed spaces, and to provide the optimal light intensity in each space. Moreover, information obtained from said algorithm can be used to alert a user of the system to a desired time for replacing a lens of the lighting system.

The terms "photosynthetically available radiation" or "PAR" refer to the spectral range (wave band) of solar radiation from 400 to 700 nanometers that photosynthetic organisms are able to use in the process of photosynthesis. PAR is measured in energy units (Watts per square meter) or in photosynthetic photon flux density (PPFD) units (mol per square meter per second), namely the number of photons in the 400 to 700 nm range received by a surface for a specified amount of time.

In an embodiment of the invention the light source is a light-emitting diode (LED). In one embodiment the LED light source comprises a chip-on-board (COB) LED, e.g., 201 and a LED lens, e.g., 204, both as shown in FIG. 2. The COB LED modern technology provides several benefits over more traditional light sources, such as better light distribution (by emitting light over a wider area) and low thermal resistance requirements (due to efficient heat dissipation). Moreover the LED lens also contributes to the desired lighting effect, by enabling precise control over the beams of light. The LED lens also offers a more aesthetic appearance by masking the LED components within. However, as will be apparent to the skilled person, any other suitable lighting source can be employed and the system of the invention can be easily adapted to use any such source.

Examples of shapes of the LED lens, according to the invention, include, but not limited to, round, square and hexagonal. Examples of LED lens material include, but not limited to, plastic and silicone. The LED lens, according to the invention, is rigid or flexible.

The cooling unit of lighting element 201, when one is provided, comprises at least one fan 402. However, in some embodiments the presence of a fan on element 201 is not necessary. The temperature of the defined indoor space is controlled by a plurality of fans 403. The fan speed can be increased or decreased according to the difference between the target temperature and the actual internal temperature of the space. Accordingly, the fan speed is increased when there is a difference between the target and internal temperature, and the internal temperature is higher than the target temperature. In contrast, when the internal temperature is higher than the target temperature but the difference between the target and internal temperatures is relatively low, the fan speed is decreased. The actual internal temperature of the space is determined by at least one temperature sensor, which can be located in or on the system, or in any other desired location in the controlled space. The cooling unit also comprises an external temperature sensor which determines the temperature outside the defined space. The system of the invention can automatically control the temperature in the closed space by using a climate algorithm that can take the outside temperature under consideration, or set-up operating points that can be set manually and/or controlled by automated means. Such algorithms are understood by the skilled person and, therefore, a detailed description thereof is not needed.

According to one embodiment of the invention, at least one temperature sensor is provided within the closed space. Temperature sensors can be of a variety of types known in the art and maybe adapted to transmit data to the control system by wired or wireless connection, all of which is known to the skilled person and, therefore, not described herein in detail, for the sake of brevity.

According to an embodiment of the present invention, the climate algorithm of the system receives information from the temperature sensors and uses the light sources and fans to control the temperature within the defined space. The climate algorithm uses the speed of the fans and the heat emitted by the light source in order to control the space temperature. In order to cool the space, the algorithm changes the fans' speed, dims the light, and uses the external temperature to determine their operational parameters.

The system is powered by a power supply 405 (FIG. 4) located inside casing 401. In one embodiment of the invention, power supply 405 obtains energy through an electric connection with an electric outlet located inside or outside the closed space. Alternatively, power supply 405 obtains energy from an energy storage device, such as a battery.

The system of the invention is provided with electronic components, circuits, and processors responsible for receiving input, processing information and displaying output (not shown). The input received thereby can include data according to the control algorithm, such as the dimensions of the space, and the target temperature set by a user and the actual internal and external temperature measured by the temperature sensors. The input data are processed according to the control algorithm and/or the climate algorithm, namely the system determines the optimal light intensity and/or the number and speed of active fans in order to reach the target values set by the user. The output, i.e. the target, internal and external temperatures as well as the system's temperature, space dimensions, light intensity and number and speed of active fans, can be digitally displayed on a display screen, if provided.

According to a specific embodiment of the invention, data provided by the user, such as the target temperature, can be received by remote communication, for example by using an appropriate application installed on a mobile device or any computer. In a similar remote manner, the user can view or monitor the output data through his mobile device or computer.

The above description of specific embodiments has been provided for the purpose of illustration and is not intended to limit the invention in any way. Many modification and variations can be effected in the method and system, without exceeding the scope of the invention.

I claim:

1. A portable conditioning system for controlling climate in a closed volume defined by a structural element having a top opening, comprising:
    a light source;
    a replaceable focusing lens coupled to the light source and configured for changing a field of illumination of said light source;
    a fan;
    a temperature sensor;
    control circuitry adapted to receive inputs from said sensor and from a user, and to control said light source and said fan to control circulation between air inside said closed volume and air outside said closed volume as a result thereof to control a temperature of the light source and an internal temperature in the closed volume; and
    a housing having a lower surface adapted to be reversibly positioned over said top opening and diminish flow or air through said top opening, said light source and said fan being housed in said housing, said fan positioned for circulating air between said lower surface of the housing in communication with air in said closed volume and a upper surface of the housing in communication with air outside said closed volume and wherein said housing is adapted to be moved from the structural element defining the closed volume to another structural element defining a different closed volume.

2. A system according to claim 1, wherein the housing is provided with positioning elements adapted to maintain it in positioned relationship with the structural element.

3. A system according to claim 2, wherein the positioning elements include a rim extending from a perimeter of the housing, or portions of such a rim.

4. A system according to claim 1, further comprising sealing elements adapted to prevent and/or diminish air flow through said opening provided at the top of the structural element.

5. A system according to claim 1, wherein said light source includes multiple sources and each of said multiple sources is provided with a respective cooling apparatus.

6. A system according to claim 5, wherein said fan includes a plurality of fans and wherein each said respective cooling apparatus comprises at least one of said plurality of fans.

7. A system according to claim 1, wherein the light source is adapted to generate heat.

8. A system according to claim 1, wherein the light source is located toward the center of the housing.

9. The system of claim 8, wherein the fan includes a plurality of fans located on both sides of the light source.

10. A system according to claim 1, comprising a filtering cassette.

11. A system according to claim 10, wherein the filtering cassette comprises a frame, a top net as a top surface of the cassette, a bottom net as a bottom surface of the cassette, and an absorbent material, located between said top net and said bottom net.

12. A system according to claim 11, wherein the absorbent material is active carbon particles.

13. A system according to claim 10, wherein said fan is configured to cause air from inside the closed volume to flow through the cassette.

14. A system according to claim 1, wherein the closed volume is selected from a vegetable-growth receptacle, a hutching facility and a living structure.

15. The system of claim 1, wherein excess heat generated by the light source is removed using one or more fans adapted to circulate air within the closed volume.

16. A portable system for controlling an environment in a closed volume, comprising:
    a light source;
    a first temperature sensor positioned to gauge an internal temperature inside the closed volume;
    a second temperature sensor positioned to gauge an external temperature outside the closed volume;
    a fan;
    a control circuitry adapted to receive inputs from said first temperature sensors said second temperature sensor and from a user, and to adjust an intensity of said light source and to increase and decrease a speed of said fan as a result thereof to control the temperature of the light source and the temperature in the closed volume;
    a housing said light source, fan and said control circuitry; said housing adapted to be positioned at a top of a structural element defining a closed volume with a lower surface of the housing in communication with the closed volume and an upper surface of the housing in communication with air outside said closed volume, said fan controlling air flow between said lower surface and said upper surface and wherein said housing adapted to be moved from the closed volume to another; and
    a filtering cassette located in a path of said air flow.

17. A system according to claim 16, wherein the filtering cassette comprises a frame, a top net as a top surface of the cassette, a bottom net as a bottom surface of the cassette, and an absorbent material, located between said top net and said bottom net.

18. A system according to claim 16, wherein the cassette is located above said fan.

19. A system according to claim 16, wherein the filtering cassette includes active carbon particles.

* * * * *